Jan. 17, 1928.
F. H. GOODRICH
1,656,481
BUMPER
Filed May 26, 1926
2 Sheets-Sheet 1
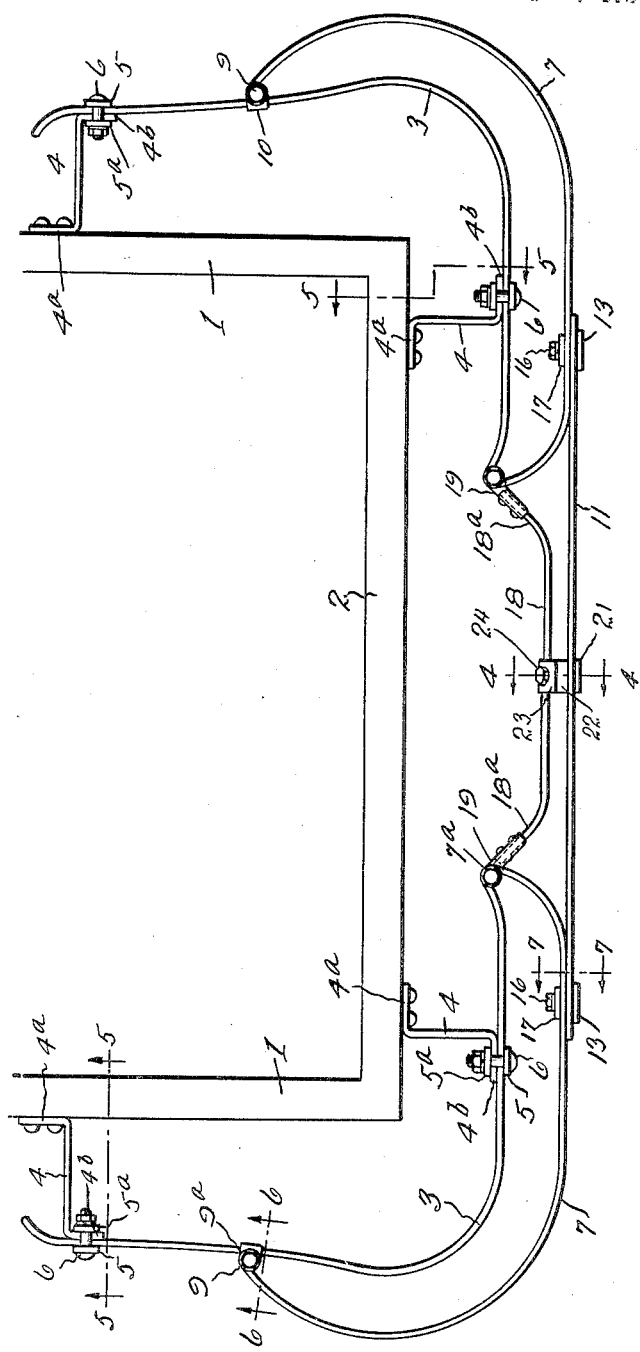
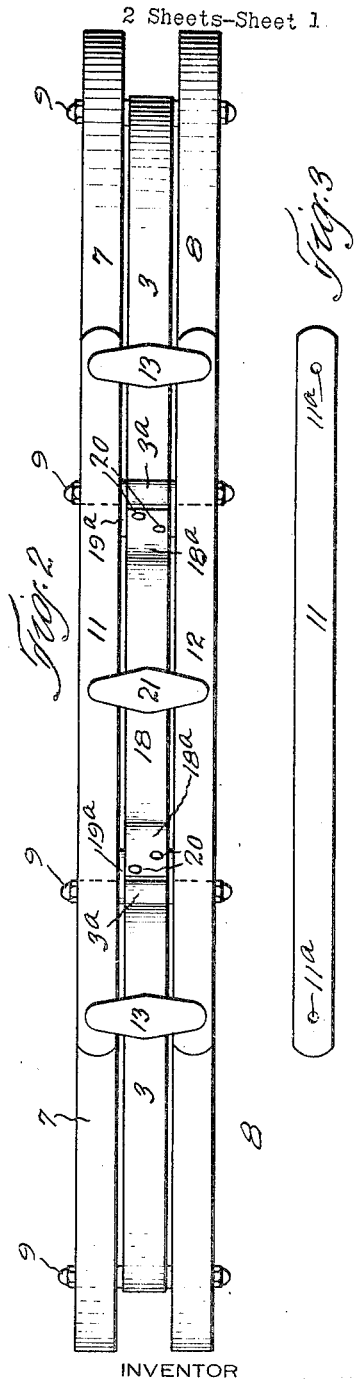
INVENTOR
Francis H. Goodrich
BY Hull, Brock & West
Attys.

Jan. 17, 1928.
F. H. GOODRICH
BUMPER
Filed May 26, 1926
1,656,481
2 Sheets-Sheet 2
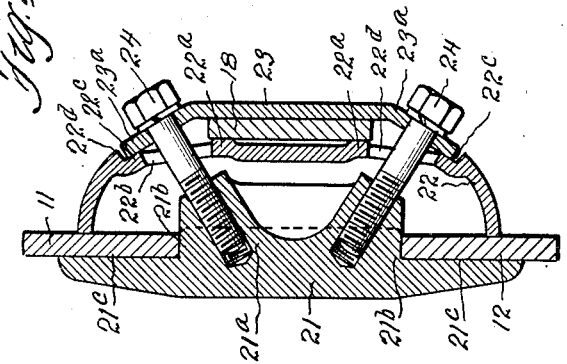
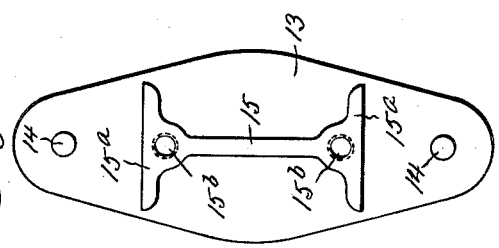
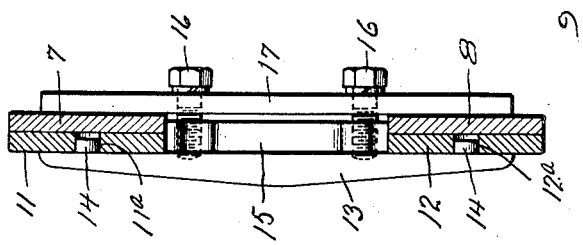
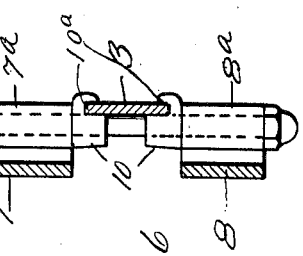
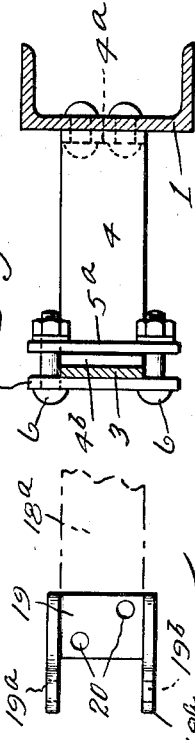
INVENTOR
Francis H Goodrich,
By Hull, Brock & West.
Attys.

Patented Jan. 17, 1928.

1,656,481

UNITED STATES PATENT OFFICE.

FRANCIS H. GOODRICH, OF DETROIT, MICHIGAN, ASSIGNOR TO THE C. G. SPRING & BUMPER COMPANY, OF DETROIT, MICHIGAN, A CORPORATION OF DELAWARE.

BUMPER.

Application filed May 26, 1926. Serial No. 111,763.

This invention relates to bumpers for automobiles and, in the particular embodiment disclosed herein, is especially adapted for use as a combined rear-bumper and corner-guard bumper with omnibuses.

It is the general purpose and object of the invention to provide a bumper of this character which is particularly efficient for the purpose for which it is intended and designed.

Further and more limited objects of the invention are to provide a corner-guard bumper construction for a vehicle (and particularly an omnibus) which will afford an effective resilient protection for the corners and at least part of an end of such vehicle; which may be conveniently applied to and removed from the corner portions of the vehicles; and which will serve to absorb and dissipate throughout its extent any blows or impacts which may be received thereby.

A further object of the invention is to provide a corner-guard bumper construction with which there may be combined, in a convenient manner, a central bumper section, whereby complete and efficient bumper-protection for the rear of the vehicle may be conveniently attained.

Further and more limited objects of the invention will be set forth hereinafter and will be realized in and through the construction and arrangement of parts shown in the drawings, wherein Fig. 1 represents a plan view of a bumper constructed in accordance with my invention, together with the cooperating parts of the vehicle frame to which it is applied; Fig. 2 a rear elevation of the bumper; Fig. 3 an elevation of one of the central bumper bars; Figs. 4, 5, 6 and 7 sectional details corresponding respectively to the lines 4—4, 5—5, 6—6 and 7—7 of Fig. 1; Fig. 8 an elevation of one of the clamping members shown in Figs. 6; and Fig. 9 a rear elevation of the connecting member for one end of the front middle bar of the central bumper section, the said bar being indicated by dot-and-dash lines.

Describing the various parts by reference characters 1 represents the rear ends of the side members and 2 the rear cross member of a vehicle frame.

Where a form of my bumper is employed which extends across the entire rear end of the vehicle, the same comprises a pair of resilient corner-guard bumpers, each of which is supported from the appropriate side and end members of the vehicle frame, together with a central bumper connected to such corner guard bumpers. The corner guard bumpers shown herein are identical in construction and each comprises a curved resilient auxiliary bar 3, which bar extends from a point considerably in front of the rear of the vehicle frame alongside and spaced from the corresponding side member 1 and around the corner of the vehicle frame and alongside and spaced from the outer portion of the rear cross member 2. The bar 3 is bowed outwardly adjacent the corner formed between the members 1 and 2 and is supported from the said members by means of combined supporting and spacing arms 4, 4. One of the arms 4 has a flange $4^a$ which is secured to the side member 1 and a flange $4^b$ by means of which it is secured to the bar 3 by means of clamping plates 5, $5^a$ and bolts 6. The other supporting and spacing arm 4 is provided with a flange $4^a$ secured to the rear member 2 and with a flange $4^b$ by means of which and clamping plates 5 and $5^a$ and bolts 6 it is secured to the bar 3.

The bar 3 on the opposite side of the vehicle is supported from the members 1 and 2 in the same manner as the bar just described; and the spacing and supporting arms and the various parts are designated by like reference characters on both sides of the vehicle frame.

7 denotes an upper and 8 a lower impact bar, each having eyes $7^a$ and $8^a$ at opposite ends thereof, respectively. The aligned upper and lower eyes $7^a$ and $8^a$ are connected by means of a bolt 9 extending therethrough and through a pair of clamping sleeves 10, each sleeve having a seat $10^a$ which is adapted to receive the upper and the lower edge respectively of the portion of the bar 3 adjacent thereto. The opposite ends of the bars 7 and 8 are provided with eyes $7^a$ and $8^a$ respectively, which are aligned with an eye $3^a$ on the rear end of the corresponding bar 3 and are connected to said eye $3^a$ by a bolt 9.

It will be noted that the bars 7 and 8 project rearwardly and outwardly beyond and substantially parallel with the portion of the bar 3 which is interposed between the same and the corner portion of the vehicle frame. This provides, in effect, a pair of corner bumpers each consisting of an auxiliary bar 3 and impact bars 7 and 8, the auxiliary bars and the impact bars being connected by bolts extending through eyes in the ends thereof.

With the parts arranged and constructed as described thus far, each rear corner of the vehicle frame is provided with a bumper extending therearound, each bumper comprising a resilient auxiliary bar extending about and spaced from such corner, with rearwardly and inwardly bowed impact bars connected at their ends to the auxiliary bar by bolts extending through eyes at the ends of the impact bars, the bolts at the front ends of the impact bars extending through clamping sleeves engaging the auxiliary bars and the bolts at the rear and inner ends of the impact bars extending through eyes in said bars and through eyes $3^a$ provided on the corresponding ends of the intermediate auxiliary bar 3. The front ends of the bars 3 are extended beyond the front ends of the impact bars and such projecting ends are secured to the side members 1 by means of the front arms 4, as described hereinbefore.

Where it is desired to protect the central portion of the rear of the vehicle, the opposed inner ends of the corner bumpers are connected by a central bumper structure which will now be described.

11 and 12 denote respectively an upper and a lower bumper bar extending across the rear of the space between the opposed inner ends of the corner guard bumpers and secured at their ends to the opposed bars 7 and 8, respectively. For the purpose of so securing the bars together, I employ clamps, one of which is shown in detail in Fig. 7. This clamp comprises an outer or rear clamping member having an elongated body 13 with studs 14 projecting from the ends of the front face thereof and with a rib 15 projecting forwardly from the central portion thereof, said rib being I-shaped, whereby extended horizontal shoulders $15^a$ are provided at the top and bottom of the rib, said shoulders forming seats for the adjacent edges of the overlapping portions of the bars 7, 11 and 8, 12. The rib 15 is provided with threaded apertures $15^b$ adapted to receive screw bolts 16 which secure a clamping plate 17 against the front faces of the bars 7 and 8. The bars 11 and 12 are provided with apertures $11^a$ and $12^a$, respectively, adapted to receive the studs 14.

Cooperating with the bars 11 and 12 is the auxiliary bar 18, said bar being located in front of the bars 11 and 12 and having a central elongated portion extending substantially parallel with the adjacent portions of the impact bars 11 and 12, with its end portions $18^a$ deflected forwardly and each secured to and within an end connection 19. Each end connection 19 consists of a channeled body to which the adjacent end $18^a$ of the auxiliary bar 18 is secured, as by rivets 20, the side flanges of the body being extended to provide lugs $19^a$ each having an aperture $19^b$ therethrough by means of which each end connection is mounted upon the appropriate bolt 9, said bolt extending through the eyes formed on the adjacent ends of the bars 7 and 8, the eye $3^a$ on the adjacent end of the bar 3, and the apertures $19^b$ in the lugs $19^a$. It will be noted that these lugs are interposed between the ends of the eye $3^a$ and the adjacent ends of the eyes on the bars 7 and 8 and serve in effect as spacing washers.

The central portion of the bar 18 is connected to the central portions of the bars 11 and 12 by means of a clamp, shown in detail in Fig. 4 and comprising a rear body member 21 having a forwardly projecting central portion $21^a$ providing seats at $21^b$ for the lower edge of the upper bar 11 and for the upper edge of the lower bar 12. The rear part of the member 21 is extended upwardly and downwardly to provide seats $21^c$ for the rear faces of the said bars. Cooperating with the member 21, is an intermediate clamping member, the same comprising an arched body 22 the ends of which bear against the front sides of the bars 11 and 12 and press said bars against the seats $21^c$. The front of the body 22 is provided at the central portion thereof with vertically spaced horizontal ribs $22^a$ adapted to engage the rear face of the bar 18 adjacent the top and bottom edges thereof. 23 denotes the central portion of the front member of the clamp. This front member is provided with rearwardly inclined end portions $23^a$ each having an aperture therein for a screw bolt 24, the bolts extending through apertures $22^b$ in the member 22 and being threaded into the central portion $21^a$ of the rear member 21. Beyond each aperture $22^b$, the member 22 is provided with an inclined seat $22^c$ for the end of the cooperating inclined end $23^a$ of the front member 23. Above the top of the upper seat and below the bottom of the lower seat $22^c$ a ledge $22^d$ is provided for the cooperating end $23^a$ of the front member 23. The member 23, being made of resilient material, this construction enables the ends $23^a$ of such clamping member to be sprung toward the body of the clamping member 22 by setting up the screw bolts 24, thereby insuring a firm clamping action between the clamping members 22 and 23 and the bar 18 and between the members 21 and 22 and the bars 11 and 12, while minimizing the danger of the said bolts unscrewing or backing off.

By the construction shown and described herein, I have produced a bumper which is particularly useful for the corners of vehicles, such as omnibuses; which can be assembled and applied to and removed from such corners with facility; and which, when in place, will form a very effective resilient protection against impacts. I have also provided a construction wherein, by applying the central bars 11, 12 and 18 in substantially the manner described, I am enabled to produce complete protection extending not only about the corners but entirely across the end of such vehicle and one which will present the appearance of a bumper having continuous upper and lower impact bars with a continuous intermediate auxiliary bar connected to and spaced forwardly from the impact bars. The arrangement of the rear bracing and supporting members 4 adjacent to the inner ends of the bar 3 enables the inner end portions of the corner bumpers to receive and withstand impacts of considerable magnitude, without injury; it also provides a proper support (in conjunction with the inner end parts of the bars 3, 7 and 8) for the central bumper section including the bars 11, 12 and 18.

The support arms 4 being adjustable along the length of the bars 3 will facilitate application of the bumper to frames of different widths. By using support arms of different lengths, or by springing the bar 3, the spacing from the side or end members can be varied to give protection at the desired distance. It is apparent also that corner bumpers constructed as described can be used without the central bumper section since each corner bumper is a complete unit in itself. It is further apparent that the length of the central bumper section can be varied to suit the particular width or space which it is desired to protect.

The bumper shown herein is designed with special reference to use on the rear ends of vehicles, such as omnibuses, and the terms "front" and "rear" are used to denote the positions of the parts thereof in the specification and in some of the claims, but without any intention thereby of limiting the positions in which my bumpers may be used or of limiting the use of bumpers to any particular end of a vehicle, should changes in the construction of vehicles hereafter render my bumper capable of application to parts other than the rear thereof.

Having thus described my invention, what I claim is:

1. The combination, with an end portion of a vehicle frame, of a bumper for each corner of such end, each bumper comprising a bar support at one end from a side of such end portion and spaced from such side and extending about the adjacent portion of the end and supported by and in spaced relation from such end portion, the rear and inner ends of the said bars being presented toward and spaced from each other and extending inwardly beyond the point at which their respective supports are secured to the end portion of the said frame.

2. The combination, with an end portion of a vehicle frame, of a bumper for each corner of such end, each bumper comprising a bar having a portion extending alongside and supported by and in spaced relation from one of the side members of said frame, each such bar extending around the adjacent corner of such frame and supported from and in spaced relation to the end member of said frame, and one or more impact bars secured to each of the first mentioned bars and extending around the opposite corners of said frame, the inner ends of said bumpers being presented toward and spaced from each other and extending inwardly beyond the point at which their respective supports are secured to the end member of the said frame.

3. The combination, with an end portion of a vehicle frame, of a bumper for each corner of such end, each bumper comprising a bar having a portion adapted to extend alongside one of the side members of said frame and around the adjacent corner of such frame, an arm supporting each bar from a side member of the frame, and an arm supporting the rear and inner portion of each such bar from the rear member of said frame, the inner ends of the said corner bumpers being presented toward and spaced from each other and extending beyond said last mentioned arm.

4. The combination with an end portion of a vehicle frame, of a bumper for each corner of such end, each bumper comprising a bar having a portion extending alongside and supported by and in spaced relation from one of the side members of said frame, each such bar extending around the adjacent corner of such frame and supported from and in spaced relation to the end member of said frame, one or more bars each secured at its opposite ends to one of the first mentioned bars and projecting about a corner of the vehicle frame and bowed outwardly beyond the first mentioned bar, the inner ends of the said bumpers being presented toward and spaced from each other and extending inwardly beyond the point at which their respective supports are secured to the end member of the said frame.

5. The combination, with an end portion of a vehicle frame, of a bumper for each corner of such end, each bumper comprising an auxiliary bar having a portion extending alongside and supported by and in spaced relation from one of the side members of said frame, each such bar extending around the adjacent corner of such frame and supported by and in spaced relation from the end member of said frame, an upper and a lower impact bar for each of the first mentioned bars, each pair of upper and lower bars having their rear ends pivotally secured to one of the auxiliary bars, in front of the adjacent corner of said frame, and each such pair of impact bars having their opposite ends pivotally connected to the opposite inner ends of their respective auxiliary bars, each of the impact bars having its body portion bowed outwardly and rearwardly with respect to the corresponding portion of its auxiliary bar.

6. The combination, with the rear end portion of a vehicle frame, of a pair of corner bumpers comprising each an auxiliary bar extending about each corner of the frame and supported in spaced relation with respect to the cooperating side and end members of said frame, a pair of impact members secured at their front ends to each auxiliary bar above and below such auxiliary bar and having their rear ends secured to the rear end of the corresponding auxiliary bar and above and below the same, an intermediate bumper section comprising a front bar having its ends connected to the opposed inner ends of the corner bumpers and an upper and a lower rear impact bar having their ends connected to the opposed portions of the upper and lower impact bars of the corner bumpers, and a spacing clamp connecting the central portions of the bars of such intermediate bumper section.

7. The combination, with the rear end portion of a vehicle frame, of a pair of corner bumpers comprising each an auxiliary bar extending about each corner of the frame and supported in spaced relation with respect to the cooperating side and end members of said frame, an impact member secured at its front end to each auxiliary bar and having its rear end secured to the rear end of the corresponding auxiliary bar, and an intermediate bumper section comprising a front bar having its ends connected to the opposed inner ends of the corner bumpers and a rear impact bar having its ends connected to the opposed portions of the impact bars of the corner bumpers.

8. The combination, with an end portion of a vehicle frame, of a pair of corner bumpers each carried by each side member and the end member of the frame, each of said bumpers comprising an auxiliary bar having its front portion supported by and spaced from one of the side members of the frame and extending about the corner of said frame and toward the central portion of the rear member thereof and a support connected to the rear member and to each auxiliary bar at a point spaced from the rear end of said bar, and one or more impact bars cooperating with each auxiliary bar and each having its front end connected to the corresponding auxiliary bar and its rear end connected to the rear end of said auxiliary bar.

9. The combination, with an end portion of a vehicle frame, of a bumper comprising a corner bumper extending around each corner of the frame and supported in spaced relation with respect thereto, the ends of the corner bumpers extending inwardly beyond the ends of the side members of the frame and beyond the supports from the frame, and a central bumper section connected to the opposed inner ends of the corner bumpers.

10. The combination, with an end portion of a vehicle frame, of a pair of corner bumpers each comprising an auxiliary bar extending about a corner of the frame, the inner and rear ends of the auxiliary bars extending beyond the side members of the vehicle frame and being presented toward each other and each corner bumper comprising also an upper and a lower impact bar, the impact bars being secured at their opposite ends to their respective auxiliary bars, and an intermediate bumper section comprising a front bar connected at its ends to the opposed ends of the corner bumpers and constituting a central extension of the auxiliary bars thereof and upper and lower impact bars secured to the upper and lower impact bars of the corner bumpers.

11. The combination, with an end portion of a vehicle frame, of a pair of corner bumpers each comprising an auxiliary bar extending about a corner of the frame, the inner and rear ends of the supporting bars extending beyond the side members of the vehicle frame and being presented toward each other and each corner bumper comprising an impact bar, the impact bars being secured at their opposite ends to their respective auxiliary bars, and an intermediate bumper section comprising a front bar connected at its ends to the opposed ends of the corner bumpers and a rear impact bar secured to the impact bars of the corner bumpers.

12. The combination, with an end portion of a vehicle frame, of a pair of corner bumpers each comprising an auxiliary bar extending about a corner of the frame, the inner and rear ends of the auxiliary bars extending beyond the side members of the vehicle frame and being presented toward each other and each corner bumper comprising also an upper and a lower impact bar, the impact bars of each corner bumper having their front ends secured to the corresponding portions of their respective auxiliary bars, the rear and inner ends of the auxiliary and impact bars having eyes, bolts extending through the aligned eyes of the auxiliary and impact bars, the said bumper having an intermediate section comprising a front or auxiliary bar having at each end thereof a pair of perforated lugs adapted to receive the bolt at the end of the corner guard bumper and adjacent thereto, the said intermediate bumper comprising also an upper and a lower impact bar secured at their ends to the corresponding upper and lower impact bars of the opposed corner guards, and means clamping together the central portions of the three bars of the intermediate bumper section.

13. The combination, with an end portion of a vehicle frame, of a pair of corner bumpers each comprising an auxiliary bar extending about a corner of the frame, the inner and rear ends of the auxiliary bars extending beyond the side members of the vehicle and being presented toward each other and each corner bumper comprising an upper and a lower impact bar, the impact bars of each corner bumper having their front ends secured to the corresponding portions of their respective auxiliary bars, the rear and inner ends of the auxiliary and impact bars having aligned eyes, the said bumper having an intermediate section comprising a front or auxiliary bar having at each end thereof a pair of vertically spaced perforated lugs adapted to receive therebetween the eye on the auxiliary bar adjacent thereto, bolts extending through the aligned eyes and lugs at the inner ends of the said corner bumpers, the said intermediate bumper comprising also an upper and a lower impact bar secured at their ends to the corresponding upper and lower impact bars of the opposed corner guards.

14. The combination, with a pair of vertically spaced bars and an intermediate bar of a bumper, of means for clamping said bars together, the said means comprising a clamping member having a central extension adapted to be projected between such vertically spaced bars and having seats for the rear faces of said bars, an arched clamping member adapted to receive therein the central extension of the first clamping member and to engage the front faces of such vertically spaced bars with the ends thereof, a third clamping member adapted to engage the front face of the intermediate bar and press the rear face of said bar against the front of the intermediate member, and means for securing the front clamping member to the central extension of the first mentioned member.

15. The combination, with a pair of vertically spaced bars and an intermediate bar of a bumper, of means for clamping said bars together, the said means comprising a clamping member having seats for the rear faces of said bars, a second clamping member having end portions adapted to engage the front faces of such vertically spaced bars, a third clamping member adapted to engage the front face of the intermediate bar and press the rear face of said bar against the front of the intermediate member and means for securing the third clamping member to the central portion of the first mentioned member.

16. The combination, with a pair of vertically spaced bars and an intermediate bar of a bumper, of means for clamping said bars together, said means comprising a clamping member having a central extension adapted to be projected between such vertically spaced bars and having seats for the rear faces of said bars, an arched clamping member adapted to receive the extension of the first mentioned member and to engage with its ends the front faces of the first two bars, the second member having a centrally arranged seat for the rear face of the intermediate bar and provided with a seat above and a seat below such central seat for such intermediate bar, and a third clamping member adapted to engage the front face of the intermediate bar and having extensions adapted to engage the second and third seats of the second member, and bolts extending through the upper and lower ends of the third member and threaded into the projection of the first member.

17. The combination, with a pair of vertically spaced bars and an intermediate bar of a bumper, of means for clamping said bars together, the said means comprising a clamping member having a central extension adapted to be projected between such vertically spaced bars and having seats for the rear faces of said bars, an arched clamping member adapted to receive the extension of the first mentioned member and to engage with its ends the front faces of the first two bars, the second member having a central seat for the rear face of the intermediate bar and provided with a seat above and a seat below such central seat for such intermediate bar, and a third clamping member adapted to engage the front face of the intermediate bar and having an upper inclined extension and a lower inclined extension, the said extensions adapted to engage the upper and lower seats on the second member, and bolts extending through such extensions of the third member and through the second member and threaded into the central extension of the first clamping member.

18. The combination, with two pairs of vertically spaced impact bars of a bumper, of means for securing the upper and the lower bars together, said means comprising a clamping member adapted to engage the exposed faces of one pair of upper and lower impact bars and provided at its central portion with a rib adapted to extend between the two upper and the two lower impact bars and to provide seats for the lower edges of the upper bars and for the upper edges of the lower bars, a cooperating clamping member adapted to engage the opposite faces of the other pair of upper and lower impact bars, and bolts extending through the last mentioned clamping member and threaded into the said rib on the first mentioned member.

19. The combination, with vertically spaced bumper bars, of means for securing the said bars together, said means comprising a clamping member provided at its central portion with a rib adapted to extend between the said bars and to provide seats for the proximate edges thereof, said member having seating portions above and below said rib for corresponding faces of said bars, a cooperating clamping member, and bolts extending through the last mentioned clamping member and threaded into the said rib on the first mentioned member.

20. The combination, with two pairs of vertically spaced impact bars, of a bumper, of means for securing the upper and the lower bars together, said means comprising a clamping member adapted to engage the exposed faces of one pair of upper and lower impact bars and provided with studs or lugs adapted to enter openings provided therefor in such upper and lower impact bars, respectively, and having at its central portion a vertically extending I-shaped rib adapted to extend between the two upper and the two lower impact bars and to provide seats for the lower edges of the upper bars and for the upper edges of the lower bars, a cooperating clamping member adapted to engage the opposite faces of the other pair of upper and lower impact bars, and bolts extending through the last mentioned clamping member and threaded into the said rib on the first mentioned member.

21. The combination, with two pairs of vertically spaced impact bars of a bumper, of means for securing the upper and the lower bars together, said means comprising a clamping member adapted to engage the exposed faces of one pair of upper and lower impact bars and provided with studs or lugs adapted to enter openings provided therefor in such upper and lower impact bars respectively and having at its central portion a pair of vertically spaced seats adapted to extend between the two upper and the two lower impact bars and to provide seats for the lower edges of the upper bars and for the upper edges of the lower bars, a cooperating clamping member adapted to engage the opposite face of the other pair of upper and lower impact bars, and bolts extending through the last mentioned clamping member and threaded into the first mentioned member.

22. A corner bumper for a vehicle comprising a bar extending around and spaced from the corner of the vehicle and adapted to be attached thereto by means of supports adjustable upon the said bar.

23. In a corner bumper for a vehicle, the combination of a bar extending around and spaced from a corner of the vehicle, an impact bar spaced from and attached to said first mentioned bar, and means adjustable upon said first mentioned bar for supporting the bars from the vehicle.

24. In a corner bumper for a vehicle, the combination of a bar extending around and spaced from a corner of the vehicle, an impact bar attached to said bar and arms adjustably connected to said first mentioned bar for supporting the bars from the vehicle.

25. In a corner bumper for a vehicle, the combination of a front bar extending around and spaced from a corner of the vehicle, an impact bar pivotally connected to said front bar and spaced therefrom, and means for supporting said bars from the vehicle, said supporting means being adjustably connected to the said front bar.

26. In a corner bumper for a vehicle, the combination of a front bar extending around and spaced from a corner of the vehicle, an impact bar pivotally connected at one end to the said front bar and means for supporting said bars from the vehicle, said means being adjustably connected to the front bar at a point spaced from its inner end.

27. In a corner bumper for a vehicle, the combination of a front bar extending around and spaced from a corner of the vehicle, an impact bar pivotally connected to the end of the said front bar and connected to a point intermediate its ends, and means for supporting the bars from the vehicle, said supporting means including bars adjustably connected to the front bar intermediate the ends thereof.

28. The combination with a vehicle frame having side and end members, of a pair of separated corner bumpers spaced from the said side and end members, support arms adjustably connected to said corner bumpers, and a central impact section adapted to connect the opposite end portions of the said corner bumpers.

29. In a corner bumper for a vehicle, the combination of a front bar extending around and spaced from a corner of the vehicle, an impact bar pivotally connected to one end of the said front bar and means for supporting said bars from the vehicle, said means being adjustably connected to the front bar at a point spaced from its inner end.

30. The combination with a vehicle frame having side and end members, of a pair of corner bumpers spaced from the said side and end frame members, support arms adjustably connected to the said corner bumpers at points spaced from the inner ends thereof, and a central section adapted to connect the inner end portions of the said corner bumpers.

31. A corner bumper for a vehicle having side and end frame members, said bumper including a bar spaced from and having portions in planes substantially parallel to the said side and end frame members respectively, and support arms adapted to be adjustably connected to said bar.

32. A corner bumper for a vehicle having side and end frame members, an auxiliary bar spaced from and having portions in planes substantially parallel to the said side and end members respectively, an impact bar connected to and bowed from said auxiliary bar, and means adjustable upon said auxiliary bar for supporting the bars from the vehicle.

In testimony whereof, I hereunto affix my signature.

FRANCIS H. GOODRICH.